United States Patent
Menon et al.

(10) Patent No.: US 6,983,297 B2
(45) Date of Patent: Jan. 3, 2006

(54) SHIFTING AN OPERAND LEFT OR RIGHT WHILE MINIMIZING THE NUMBER OF MULTIPLEXOR STAGES

(75) Inventors: Amitabh Menon, Karnataka (IN); Ajit Gupte, Maharashtra (IN)

(73) Assignee: Texas Instruments Incorporated, Dallas, TX (US)

( * ) Notice: Subject to any disclaimer, the term of this patent is extended or adjusted under 35 U.S.C. 154(b) by 722 days.

(21) Appl. No.: 10/196,581

(22) Filed: Jul. 17, 2002

(65) Prior Publication Data

US 2003/0034824 A1     Feb. 20, 2003

Related U.S. Application Data

(60) Provisional application No. 60/312,271, filed on Aug. 16, 2001.

(51) Int. Cl.
   *G06F 15/00* (2006.01)
(52) U.S. Cl. ..................................... 708/209

(58) Field of Classification Search ................. 708/209
   See application file for complete search history.

(56) References Cited

U.S. PATENT DOCUMENTS

| | | | | |
|---|---|---|---|---|
| 4,829,460 A | * | 5/1989 | Ito | 708/209 |
| 5,726,926 A | * | 3/1998 | Makino | 708/505 |
| 5,961,575 A | * | 10/1999 | Hervin et al. | 708/209 |
| 5,978,822 A | * | 11/1999 | Muwafi et al. | 708/209 |

* cited by examiner

*Primary Examiner*—Chuong D Ngo
(74) *Attorney, Agent, or Firm*—Robert D. Marshall, Jr.; W. James Brady, III; Frederick J. Telecky, Jr.

(57) ABSTRACT

A log shifter shifting an operand left or right while minimizing the number of multiplexor stages. The log shifter may contain a set of multiplexor stages, with at least one multiplexor stage shifting a data value to the right and at least one other multiplexor stage shifting to the right. Left and right shifts may thus be obtained by using a single set of multiplexor stages. As a result, time delays and area consumed may be reduced when the upper/lower end of a desired shift value range does not equal $2^Q-1$, wherein Q equals an integer.

42 Claims, 4 Drawing Sheets

| CONTROL VALUES | | | | SHIFT VALUE |
|---|---|---|---|---|
| 8 | -4 | 2 | -1 | |
| 0 | 0 | 0 | 0 | 0 |
| 0 | 0 | 0 | 1 | -1 |
| 0 | 0 | 1 | 0 | 2 |
| 0 | 0 | 1 | 1 | 1 |
| 0 | 1 | 0 | 0 | -4 |
| 0 | 1 | 0 | 1 | -5 |
| 0 | 1 | 1 | 0 | -2 |
| 0 | 1 | 1 | 1 | -3 |
| 1 | 0 | 0 | 0 | 8 |
| 1 | 0 | 0 | 1 | 7 |
| 1 | 0 | 1 | 0 | 10 |
| 1 | 0 | 1 | 1 | -9 |
| 1 | 1 | 0 | 0 | 4 |
| 1 | 1 | 0 | 1 | 3 |
| 1 | 1 | 1 | 0 | 6 |
| 1 | 1 | 1 | 1 | 5 |

SHIFTING AN OPERAND LEFT OR RIGHT WHILE MINIMIZING THE NUMBER OF MULTIPLEXOR STAGES

This application claims priority under 35 USC §119(e)(1) of Provisional Application No. 60/312,271, filed Aug. 16, 2001.

RELATED APPLICATION(S)

The present application is related to and claims priority from the co-pending U.S. Provisional Patent Application Ser. No. 60/312, 271, entitled, "Shifting an Operand Left or Right While Minimizing the Number Of Multiplexor Stages", filed on Aug. 16, 2001, and is incorporated in its entirety herewith.

BACKGROUND OF THE INVENTION

1. Field of the Invention

The present invention relates to shifter architectures, and more specifically to a method and apparatus for shifting an operand left or right while minimizing the number of multiplexor stages.

2. Related Art

Shifters are often used to shift operands. A typical shifter receives an operand and a shift value, and generates a desired result by shifting the operand a number of positions determined by the shift value. For example, if a 10 bit operand (with bit positions 1–10) has to be right shifted by a shift value of 3, then bits 1 through 7 of the operand are respectively moved to bit positions 4 to 10. The sign of the operand is placed in bit positions 1–3 in the case of an arithmetic shift operation, and a zero is placed in the bit positions in the case of a logical shift operation.

Log shifters are a type shifters containing a number of stages, with each stage typically containing a multiplexor. Each stage receives a data value and a shifted data value as inputs, and selects one of the two inputs depending on a control bit. An operand to be shifted is a provided as the data value for the first stage, and the output of each stage is provided as a data value to the subsequent stage. The control bits applied to all multiplexors together forms the shift value, and determines the extent of the shift by a log shifter.

Log shifters are often required to implement both left shifting and right shifting operations. In a typical prior architecture, one set of stages is used to perform a right shift operation and another stage is used to perform a left shift operation to generate a respective one of the two output, and one of the two outputs is selected based on a sign of the shift value. The selection may be performed using another multiplexor stage.

One problem with such an architecture is that the number of stages used may cause unacceptably long time delays in performing shift operations. The long time delays are particularly unacceptable in real-time application environments in which operations may need to be performed quickly.

In addition, the implementations may require a large number of transistors (and thus the area occupied) due to the separate set of stages used. As the number of transistors would approximately equal a multiple of the number of bits in the operands, the total number of transistors may be unacceptably high for operands containing a large number of bits.

Therefore, what is needed is a log shifter which uses a minimum number of stages to shift operands in both left and right directions while potentially minimizing the number of transistors required.

SUMMARY OF THE INVENTION

A log shifter in accordance with the present invention contains a first multiplexor shifting an operand in one direction to generate a first output. A second multiplexor shifts the first output in the opposite direction to generate a second output.

By employing multiplexors shifting in both directions, a single set of multiplexors may be used to achieve both right and left shifts. The number of multiplexor stages are minimized in situations when the upper/lower end of desired shift value range does not equal $2^Q-1$, wherein Q is an integer.

The first multiplexor is designed to select either an operand (to be shifted) or the operand shifted in the one direction to generate the first output. The second multiplexor is designed to select either the first output or the first output shifted in the opposite direction to generate the second output. As may be appreciated, when log shifters shift in opposite directions, the bits shifted out (lost) by an earlier multiplexor may need to be recovered (shifted in) by later multiplexors shifting in opposite direction.

Accordingly, a log shifter may further contain a recovery circuit which forwards a bit shifted out by the first multiplexor to the second multiplexor. In an embodiment, the recovery circuit contains an AND gate performing a logical AND of the bit shifted out by first multiplexor and a control bit which controls the selection of the first multiplexor. The output of the recovery circuit is provided as an input to (shifted in by) the second multiplexor.

The log shifter may further contain a third multiplexor coupled to receive the second output. The third multiplexor may select either the second output or the second output shifted in one direction to generate a third output. The log shifter may also contain a fourth multiplexor coupled to receive the third output, with the fourth multiplexor selecting either the third output or the third output shifted in the opposite direction to generate a fourth output. The bits shifted out in the context of multiple multiplexors shifting in opposite direction present additional challenges and recovery circuits may be needed to recover the bits lost in earlier stages.

Accordingly, a log shifter may contain a second recovery circuit forwarding to the third multiplexor a second bit shifted out by the second multiplexor. The log shifter may also contain a third recovery circuit forwarding the first bit to the fourth multiplexor when second multiplexor selects the first output. The third recovery circuit forwards a third bit shifted out by the third multiplexor when third multiplexor selects the second output shifted in one direction.

A logical zero may be stored in the most significant bit positions when performing a right shift operation in a logical log shifter. In an arithmetic log shifter, the sign of the operand is stored in most significant bit positions when performing a right shift. A log shifter designed to perform both logical and arithmetic shift operations may contain another AND gate to generate a logical AND of the sign bit and a signal indicating whether an arithmetic shift or a logical shift is being performed. The output of the AND gate is stored in the most significant bit positions when right shifting the operand.

The third recovery circuit may be implemented using a fifth multiplexor selecting either the output of the AND gate or the fourth bit shifted out by the third multiplexor. In an embodiment of the log shifter, one direction corresponds to a left shift and the opposite direction corresponds to a right shift.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention allows a log shifter to shift an operand to the left or the right while minimizing the number of multiplexor stages for many ranges of operand values. The feature is achieved by using a set of multiplexors, with at least one multiplexor shifting a data value in one direction and at least one other multiplexor shifting the data value in the opposite direction. Left and right shifts may thus be obtained by using the a single set of multiplexors.

As will be clear from the description below, such a design minimizes the number of stages in the log shifter in the case of many ranges of desired shift values. By using a minimum number of multiplexor stages in the log shifter, the delay times are reduced and the shift operations are performed quickly.

The advantages of the present invention can be appreciated by first understanding the delays present in a prior approach. Accordingly, a prior approach is described first.

2. Prior Approach

Figure 1:
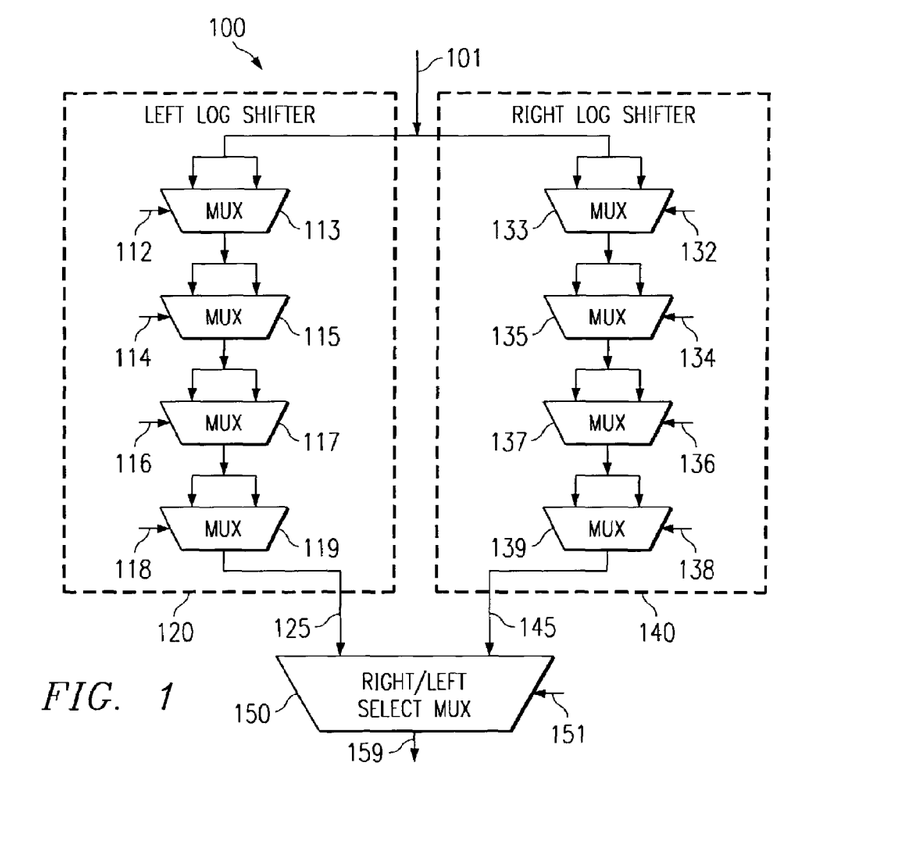
FIG. 1 is a block diagram illustrating an embodiment of a log shifter performing a shift operation.

FIG. 1 is a block diagram illustrating the details of an embodiment of a log shifter 100 which shifts an operand by a number of positions equal to the magnitude of a shift value. The direction of shift (left or right) is determined by the sign of the shift value. For illustration, the embodiment is described with reference to a logical shift operation. However, the concepts are applicable to arithmetic shift operations as well.

Log shifter 100 is shown containing left log shifter 120 and right log shifter 140, which respectively left and right shift an operand (provided on 101) by a number of positions equal to the magnitude of a shift value. The shift value is formed by the bits provided on control lines 112, 114, 116 and 118. Right/left select multiplexor 150 selects the output of either left log shifter 120 or right log shifter 140 depending on the sign bit of shift value provided on control line 151.

Left log shifter 120 is shown containing four multiplexors 113, 115, 117, and 119 which respectively left shift or pass through the corresponding input values depending on the value of the respective control bit 112, 114, 116 and 118. Multiplexors 113, 115, 117 and 119 respectively left shift corresponding input values by 1, 2, 4 and 8 positions. Thus, by appropriate selection of values for control bits, an operand can be left shifted by up to 15 positions.

The operation of right log shifter 140 is similarly described except that multiplexors 133, 135, 137, 139 respectively right shift corresponding input values by 1, 2, 4 and 8 positions. Right log shifter 140 may thus shift an operand to the right by up to 15 positions by appropriate selection of values for control bits 112, 114, 116 and 118.

Output line 159 represents operand shifted by either the left or the right depending on the sign on control signal 151. Thus, log shifter 100 shifts an operand by −15 to +15 positions, with − representing a left shift and + representing a right shift.

As may be readily appreciated, for obtaining a shift value range of +15 ($2^4$−1) to −15, four multiplexor are required for performing shift operation and one multiplexor for selecting direction of the shift are required. Even if the maximum (upper end of the) desired shift value is between ($2^{Q-1}$−1) and $2^Q$−1 (where 'Q' is an integer), a total of (Q+1) stages of multiplexors would be required. For example, to implement a log shifter in the range of −5 to +10, 5 multiplexor stages would be required.

In general, minimization of stages leads to quicker completion of shift operations, and is thus desirable. It is also noted that nine (2×Q+1) multiplexors are used for obtaining a shift between +15 ($2^Q$−1) and −15 thereby increasing the area of the integrated circuit. Minimization of the area is particularly important when each operand contains a large number of bits. It may therefore be desirable to reduce the number of multiplexors also. The manner in which the number of multiplexor stages and consumed area can be reduced is described below.

3. Present Approach

Figure 2:
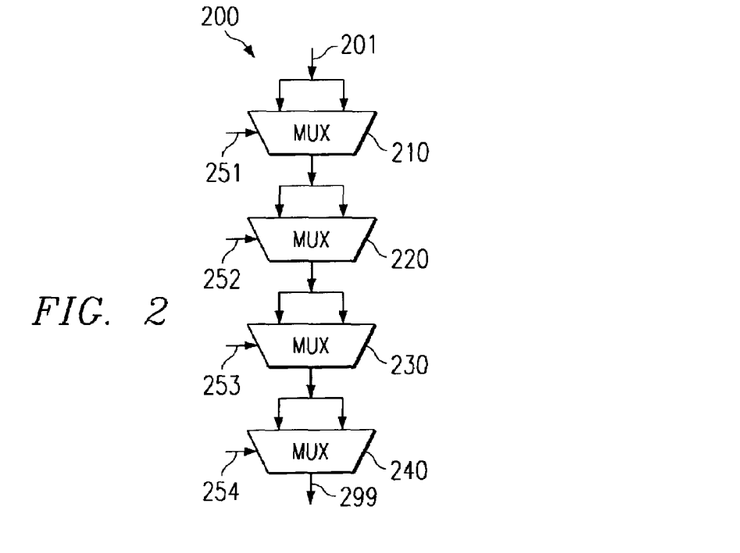
FIG. 2 is a block diagram illustrating an embodiment of a log shifter in accordance with the present invention.

FIG. 2 is a block diagram illustrating an embodiment of log shifter 200 implemented in accordance with the present invention. Log shifter 200 is shown containing four multiplexors 210, 220, 230 and 240 which respectively shift or pass through the corresponding input values depending on a bit value on the respective control lines 251, 252, 253 and 254.

In an embodiment, multiplexor 210 and multiplexor 230 shift a corresponding data value (provided as an input) to the left by 1 position and 4 positions respectively. Multiplexors 220 and 240 shift a data value to the right by 2 and 8 positions respectively. The shift is attained by providing a shifted value on one of the inputs and the unshifted value on the other input. A logical 1 on a control line causes the shifted data value to be selected and the (unshifted) data value is selected otherwise.

By appropriate values on control bits 251–254, log shifter 200 may be designed to shift an operand up to 5 positions to the left and up to 10 positions to the right as illustrated with reference to the table of FIG. 3. For example, a control value of 0011 (on control lines 254–251) causes log shifter 200 to shift the operand by 1 (i.e., shift value=1) position. Similarly, control values of 8–15 respectively cause the operand to be shifted by 8, 7, 10, 9, 4, 3, 6 and 5 positions, as may be readily observed from FIG. 3.

Figure 3:
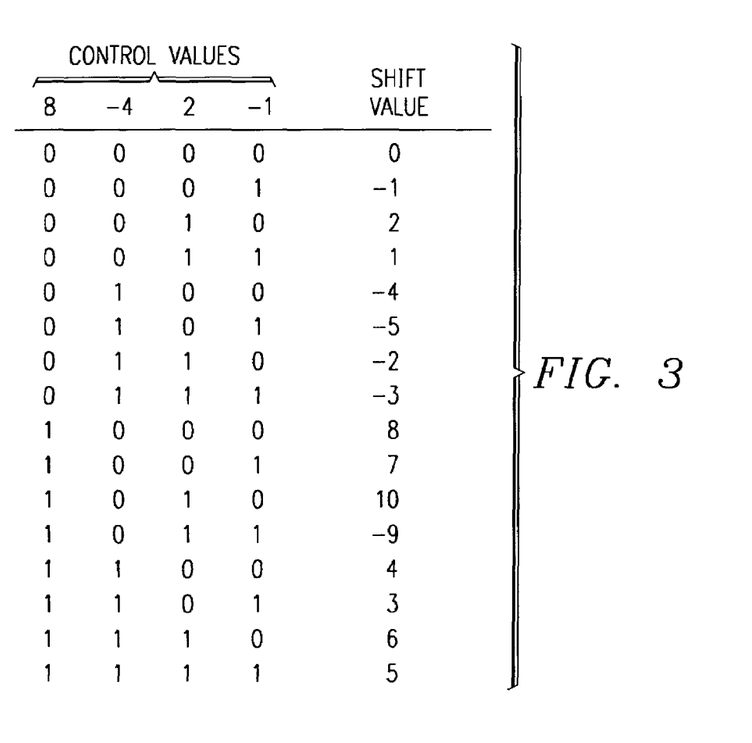
FIG. 3 is a table illustrating the range of shift values that are obtained using a log shifter implemented in accordance with the present invention.

By examination of FIG. 3, it can be verified that the entire range of shift values −5 through +10 may be obtained by using the approach of FIG. 2. A total of only four stages are used in FIG. 2. In contrast, to attain a shift of +10, a designer may need to implement a circuit similar to that in FIG. 1, which contains 5 stages.

As a result, the number of stages may be minimized in accordance with the present invention. In addition, as the number of multiplexors are also reduced, the overall area (number of transistors) consumed by an integrated circuit may also be reduced in accordance with the present invention.

One problem while implementing the present approach is that bits may be lost when shifting in opposite directions in successive stages. For example, for a shift value of 1 (right shift by 1 positions), data value needs to be shifted to the left by one position by multiplexor 210, and the resulting output is shifted to the right by 2 positions by multiplexor 220. When the bits are shifted left by one position (by multiplexor 210), a bit would be lost, which would be required in the end result.

In general, when bits are shifted first in one direction and later in another direction, bits would be lost in the earlier shifts. As a further example, to achieve a shift value of 4, multiplexor 230 first shifts the operand by 4 bits to the left, and then multiplexor 240 shifts the output of multiplexor 230 to the right by 8 bits. Unless the bits shifted by multiplexor 230 are preserved and provided to multiplexor 240, inaccurate results would be obtained.

Additional challenges would be presented when there are intermediate multiplexor stages between shifts in the opposite directions. For example, for a shift value of +7, the bit shifted out in multiplexor 210 needs to be provided to multiplexor 240 since the shift value is obtained by first shifting the operand by −1 and then by +8. The lost/recovered bit needs to be placed in bit position 8, as will be apparent by examining the intended result.

Even more challenges are presented since the bit position (s) of the recovered bits may not be fixed. For example, for a shift value of +3, the bit shifted out in multiplexor 210 is placed in bit position 12 of the eventual shifted result (on path 299), whereas for a shift value of +7, the bit lost (shifted out) by multiplexor 210 is stored in bit position 8 of the eventual shifted result. The manner in which the above noted challenges may be addressed is described below.

4. Prevention of Data Loss

Figure 4:
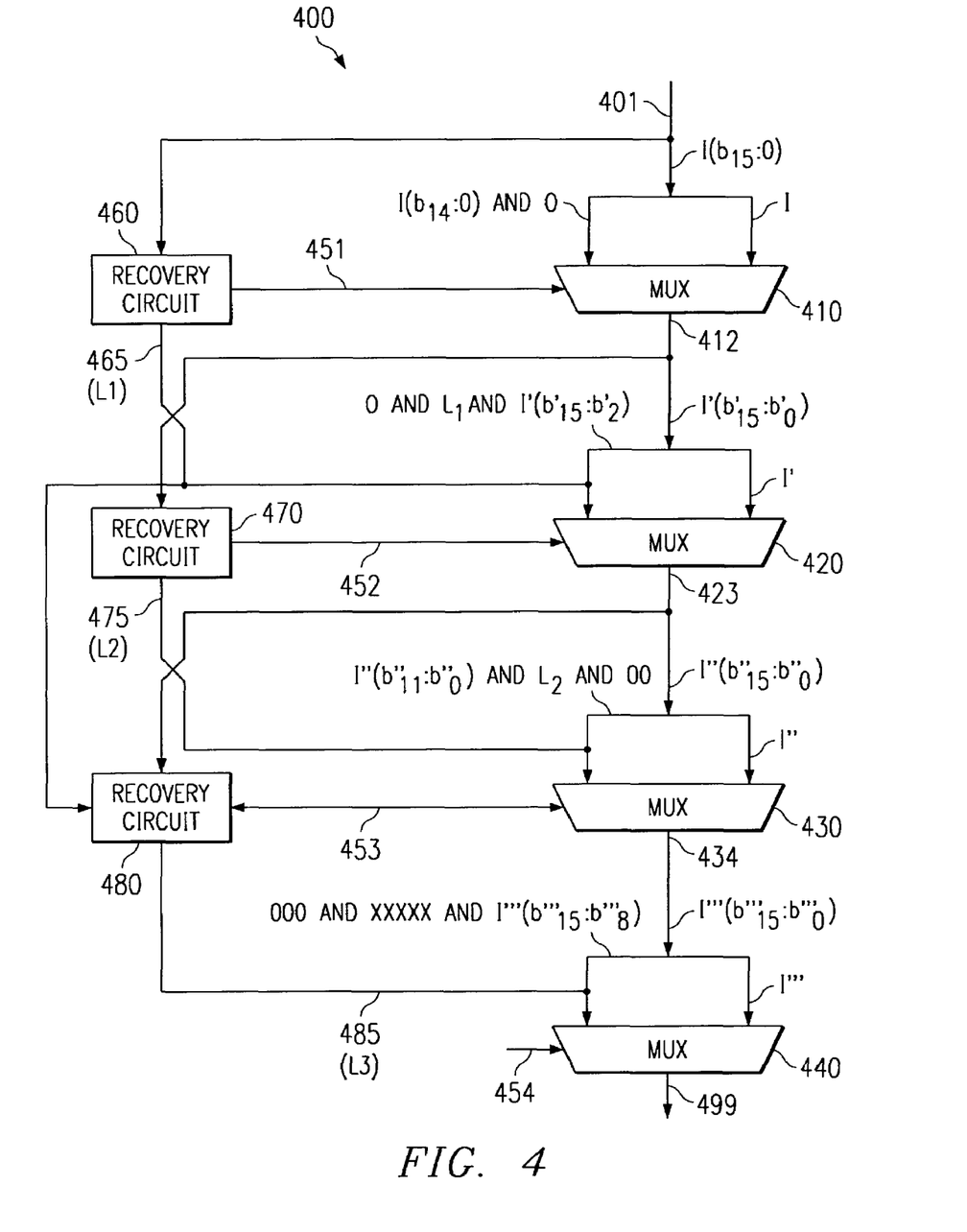
FIG. 4 is a block diagram illustrating an embodiment of a logical log shifter in accordance with the present invention.

FIG. 4 is a block diagram of an embodiment of log shifter 400 illustrating the manner in which data bits lost in previous stages may be accurately recovered. The embodiment is described first with reference to logical shifting, and then with respect to arithmetic shifting for conciseness. Log shifter 400 is shown containing four multiplexors 410, 420, 430 and 440 and recovery circuits 460, 470 and 480. Each component is described below in further detail.

Multiplexors 410, 420, 430 and 440 respectively shift or pass through the corresponding input values depending on the value of the respective control bit 451, 452, 453 and 454. Recovery circuits 460, 470 and 480 are used to propagate the shifted bits from one stage to another as required by the control/shift value. The propagated bits are recovered (shifted in) in the later stages as described below.

For illustration, it is assumed that a 16 bit operand is provided as data value (I) to log shifter 200. Data value I may be represented as b15–b0, with b15 being the most significant bit (MSB) and b0 being the least significant bit (LSB). Bits b15–b0 occupy bit positions 15 through 0 respectively. The manner in which the bits are lost and then recovered is described below with reference to each multiplexor in log shifter 400.

Multiplexor 410 selects bits b15–b0 or b14–b0&0 (with '&' representing concatenation) when control bit (on 451) is disabled (logical level of '0') or enabled (logical level of '1') respectively. Thus, a shift is performed when the control bit is enabled. The output of multiplexor 410 is represented by I' (b'15–b'0) on line 412. Bit b15 may be lost during the shift operation and is provided to recovery circuit 460.

Recovery circuit 460 performs a logic AND operation of bit b15 and control bit 451 to generate output L1 on line 465. Thus, output L1 contains bit b15 if control bit 451 is enabled and '0' if control bit 451 is disabled. As a result, the bits lost due to shift are propagated to later stages only if a shift has occurred in multiplexor 410. Output L1 is provided to multiplexor 420 and recovery circuit 480.

Multiplexor 420 performs a right shift by two positions when specified by control bit 452. When performing the right shift, multiplexor 420 recovers the bit (if) lost by multiplexor 410. Multiplexor 420 is provided {b'15–b'0} or {0 & L1 & b'15–b'2} when control bit 252 is disabled or enabled respectively. The output of multiplexor 220 is represented by I" (b"15–b"0) on line 423. Bits b'1 and b'0 may be lost during the shift operation. The shifted bits (b'0, b'1) and control bit 452 are provided as inputs to recovery circuit 470.

Recovery circuit 470 performs a logical AND operation on control bit 452 with each of the two bits (b'0, b'1) to generate corresponding two bits (represented as L2) on line 475. Thus, output L2 contains bits b'1 and b'0 if control bit 452 is enabled or zeroes if control bit 452 is disabled. As a result, the lost bits are propagated to later stages for recovery only if control bit 452 is enabled. Output L2 is provided to multiplexor 430 in order to retain the bits if required in successive stages.

Multiplexor 430 performs a left shift by 4 positions when control bit 453 is enabled. When performing the left shift, multiplexor 430 recovers the bits lost by multiplexor 420. Multiplexor 430 is provided {b"15–b"0} and {b"11–b"0 & L2, 0, 0} as inputs. One of the two inputs is selected depending on whether control bit 453 is disabled or enabled. The output of multiplexor 430 is represented by I''' (b'''15–b'''0). Bits b"15–b"12 may be lost during the left shift operation. The shifted bits (b"15 through b"12) and control bit 453 are provided as inputs to recovery circuit 480.

Recovery circuit 480 generates a five bit output (L3) containing any of the bits lost (and not yet recovered) due to left-shifts in the prior stages. Output L3 is provided to multiplexor 440. L3 can take on one of four values as noted below:

(1) {L1&b"15–b"12}: when multiplexors 410 and 430 are enabled and multiplexor 420 is disabled (shift value=3; and control value=1011);
(2) {L1 & 0000 }: when multiplexor 410 is enabled and multiplexors 420 and 430 are disabled (shift value=7; and control value=1001);
(3) {0 & b"15–b"12 }: when multiplexors 410 and 420 are disabled and multiplexors 430 is enabled (shift value=4; and control value=0011); and
(4) {00000}: when multiplexors 410, 420 and 430 are disabled (shift value=8; and control value=0001).

Multiplexor 440 performs a right shift by 8 positions when control bit 454 is enabled. Any bits previously not recovered are recovered while performing the right shift. Multiplexor 440 is provided {0, 0, 0, L3 & b'''15–b'''8} and {b'''15–b'''0} as inputs. One of the two inputs are selected depending on whether control bit 454 is disabled or enabled. The output of multiplexor 440 on line 499 represents the desired shifted operand. The description is continued with reference to example shift values for the logical log shifter described above.

5. Examples

The manner in which log shifter 400 shifts an operand for different shift values are described below. The operation of log shifter 400 is described for shift values +1, –3 and +3. The first shift value (+1) illustrates how a bit lost in left shift (in multiplexor 410) is later recovered during a right shift (by multiplexor 420). The second shift value (–3) illustrates how bits lost during a right shift (in multiplexor 420) are later recovered in a later left shift (by multiplexor 430). The third shift value (+3) illustrates how bits lost in different stages (multiplexors 410 and 430) are recovered in one stage (by multiplexor 440).

For a shift value of +1, control bits 451 and 452 are enabled while control bits 453 and 454 are disabled as may be verified from FIG. 3. Multiplexor 410 selects bits b14:b0&0 as an output since control bit 451 is enabled. L1 equals b15 as control bit is enabled. Multiplexor 420 selects 0&L1&b14:b1 as an output since control bit 452 is enabled. As noted above, L1 equals B15, and thus the output of multiplexor 420 represents the input value shifted by 1 position to the right, as desired. The output of multiplexor 420 is propagated as an output of log shifter 400 as the remaining multiplexors 430 and 440 pass the corresponding inputs.

For a shift value of –3, multiplexors 410, 420, and 430 are enabled, and multiplexor 440 is disabled. Multiplexor 420 generates an output of 0&L1&b14:b1 as described above. Recovery circuit 470 generates L2, which equals b0&0, the shifted out bits in multiplexor 420. Multiplexor 430 selects {b12:b1&L2&00}. As L2 equals b0&0, the output of multiplexor 430 equals b12–b0&000. The same output is passed through as the output of log shifter 400 as expected.

For a shift value of +3, only multiplexors 410, 430 and 440 are enabled. Multiplexor 410 selects b14:b0&0 as an output. Recovery circuit 460 generates L1=b15 as described above. The output is provided to multiplexor 430, which in turn generates an output of {b10:b0&00000}. Recovery circuit 480 generates L3=L1&b11:b14 as described above. Multiplexor 440 generates an output of {000&L3&b10:b3}. Substituting L3, we obtain 000&b15:b3, as desired.

Thus, the embodiment(s) described above recover any data bits lost in previous stages. While the above embodiments are described in the context of logical shift operations, the concepts can be easily extended to arithmetic shift operations as well. In general, when filling bits (in the most significant bit positions) during right shift operations, the sign bit of the original operand is to be used instead of 0 used for the logical shift operations. An example implementation using such a concept is described below.

6. Arithmetic Log shifter

Figure 5:
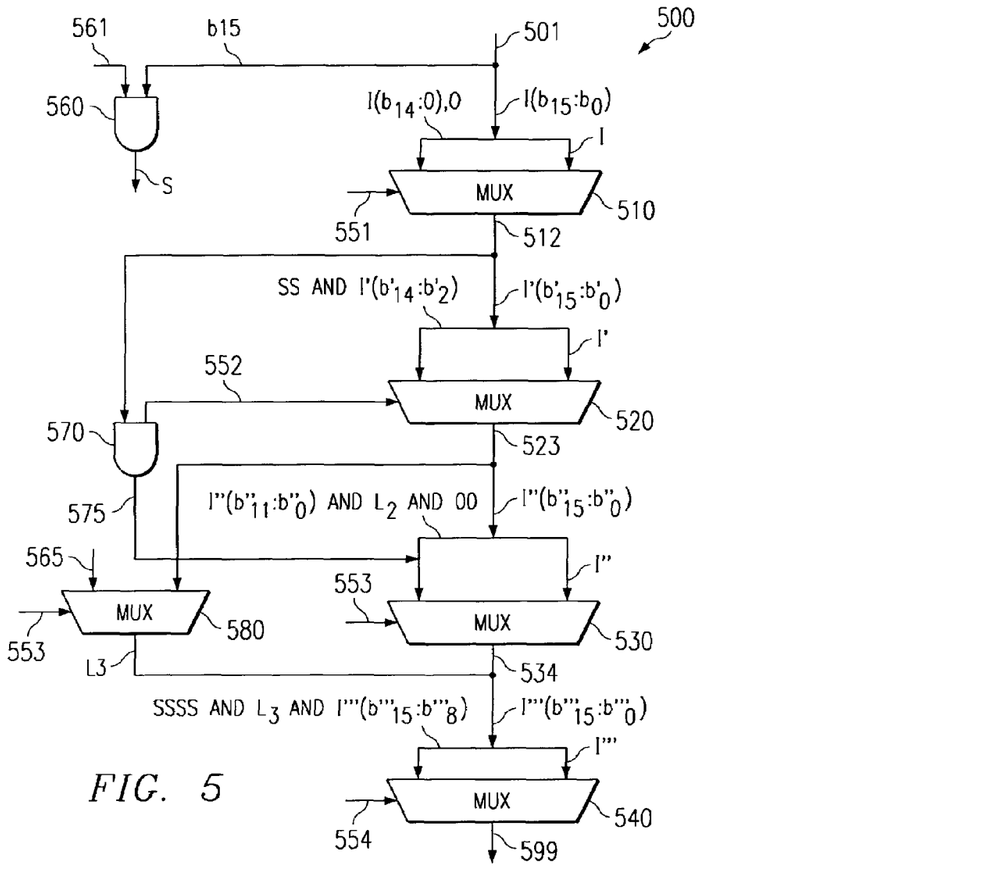
FIG. 5 is a block diagram of an arithmetic log shifter illustrating the manner in which bits may be lost and recovered when shifting bits in opposite directions.

FIG. 5 is a block diagram illustrating an embodiment of arithmetic log shifter 500. Log shifter 200 is shown containing multiplexors 510, 520, 530 and 540 in four successive stages, AND gates 560 and 570, and multiplexor 580. For illustration, it is assumed that a 16 bit operand is provided as data value (I=b15:b0) to arithmetic log shifter 500. Each component is described below in further detail.

AND gate 560 receives the most significant bit (b15) of data value I and arithmetic shift bit 561 as inputs. Arithmetic shift bit 561 is pre-set to 1 when an arithmetic shift is to be performed. The output of AND gate 560 represents the sign bit ('s') of the input operand when arithmetic shift operation is to be performed.

Multiplexor 510 selects data value (bits b15–b0) or left shifted data value bits b14–b0&0 (with '&' representing concatenation) when control bit (on 551) is disabled (logical level of '0') or enabled (logical level of '1') respectively. The output of multiplexor 510 on line 512 is represented by I' (b'15–b'0).

Multiplexor 520 performs a right shift by two positions when specified by control bit 452. Multiplexor 520 selects one of the two inputs {b'15–b'0} and {s, s & b'15–b'2} when control bit 552 is disabled or enabled respectively. The sign bits generated by AND gate 560 are stored in bit positions 15 and 14. The output of multiplexor 520 is represented by I'' (b''15–b''0) on line 523. Bits b'1 and b'0 may be lost during the shift operation. The shifted bits (b'0, b'1) and control bit 552 are provided as inputs to AND gate 570.

AND gate 570 performs a logical AND operation on control bit 552 with each of the two shifted bits (b'0, b'1) to generate corresponding two bits (represented as L2) on line 575. Thus, output L2 contains bits b'1 and b'0 if control bit 552 is enabled or zeroes if control bit 552 is disabled. Output L2 is provided to multiplexor 530 in order to retain the bits if required in subsequent stages.

Multiplexor 530 performs a left shift by 4 positions when control bit 553 is enabled. When performing the left shift, multiplexor 530 recovers the bits lost (shifted out) by multiplexor 520. Multiplexor 530 generates output I''' (b'''15–b'''0). Bits b''15–b''12 may be lost during the left shift operation. The shifted bits (b''15 through b''12) and sign bits are provided as inputs to multiplexor 580.

Multiplexor 580 is provided with bits {b''15 through b''12} and sign bits {s, s, s, s} generated by AND gate 560 as inputs. Multiplexor selects shifted bits b''15 through b''12 when control bit 553 is enabled or sign bits {s, s, s, s} when control bit 553 is disabled to generate output L3 on line 585. Output L3 is provided to multiplexor 540.

A close examination reveals that multiplexor 580 operates similar to recovery circuit 480 even though the most significant bit lost (shifted out) by multiplexor 510 is not provided to multiplexors 520 and 540 (via the respective recovery circuits). Specifically, as the s bit represents the most significant bit, the value is accurately propagated to both multiplexors 520 and 540. As an illustration, when control value equals 1011, bit position 13 of the shifted input equals s (most significant bit of the operand). When control value equals 1001, bit position 9 again equals s bit.

Multiplexor 540 performs a right shift by 8 positions when control bit 554 is enabled. While performing the right shift, multiplexor 540 recovers the bits lost by multiplexor 530 as one of the inputs is provided bits {ssss&L3&b'''15–b'''8}. Multiplexor 540 generates the operand shifted by the desired shift value on line 599. Thus, the output of multiplexor 540 on path 599 represents an operand shifted by a desired number of position. An example system in which the logical/arithmetic shift operations are implemented is described below.

7. Example System

Figure 6:
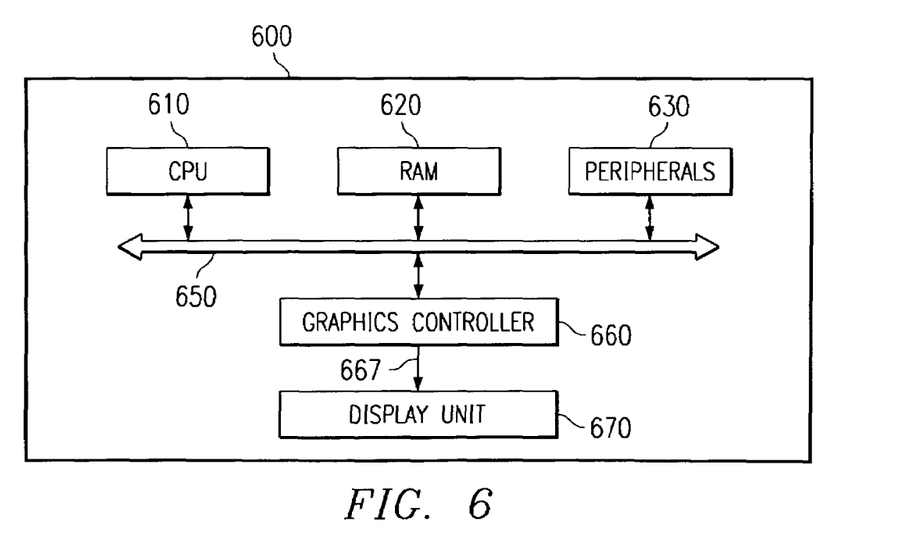
FIG. 6 is a block diagram of an embodiment computer system implemented in accordance with the present invention.

FIG. 6 is a block diagram of computer system 600 illustrating an example environment in which the present invention can be implemented. Computer system 600 includes central processing unit (CPU) 610, random access memory (RAM) 620, one or more peripherals 630, graphics controller 660, and display unit 670. Many components of computer system 600 communicate over bus 650, which can in reality include several physical buses connected by appropriate interfaces.

RAM 620 stores data representing commands and data (including operands for division operation). CPU 610 executes commands stored in RAM 620. Peripherals 630 can include storage components such as hard-drives or removable drives (e.g., floppy-drives). Peripherals 630 can be used to store commands and/or data which enable computer system 600 to operate in accordance with the present invention. Graphics controller 660 receives data/commands from CPU 610, and causes images to be displayed on display unit 670.

The shifting operation described above can be implemented within CPU 610. CPU 610 represents a processor implemented in a computer system. However, processors in accordance with the present invention can be implemented in other environments as well. Examples of such environments include (but not limited to) digital signal processors. The details of an implementation of a processor are described below.

8. Processor

Figure 7:
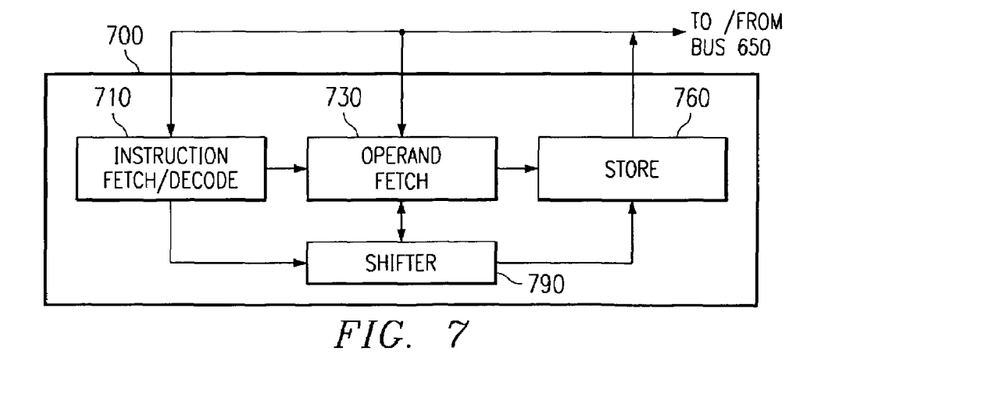
FIG. 7 is a block diagram of an embodiment of a processor implemented in accordance with the present invention.

FIG. 7 is a block diagram illustrating the details of processor 700 in one embodiment. Processor 700 is shown containing instruction fetch/decode 710, operand fetch 730, store 750 and log shifter 790. Processor 700 may correspond to CPU 610, and is described with reference to FIG. 6 for illustration. Each block of FIG. 7 is described below in further detail.

Instruction fetch/decode block 710 receives operation codes on bus 650, and decodes the instruction to determine whether a shift operation was initiated. Operand fetch block 730 provides the data value and operand to log shifter 790 to cause a shift operation to be initiated. Log shifter 790 performs a shift operation by using the shift instruction(s) provided in accordance with the present invention. Store block 760 stores the shifted operand back in any location as specified by the instruction. Thus, the present invention enables efficient implementation of shift instruction and can be used in various processors implementing shift operations.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A log shifter for shifting an operand in either left direction or right direction, said log shifter comprising:
  a first multiplexor shifting said operand in one direction to generate a first output; and
  a second multiplexor coupled to receive said first output, said second multiplexor shifting said first output in another direction to generate a second output.

2. The log shifter of claim 1, further comprising a first recovery circuit forwarding to said second multiplexor a first bit shifted out by said first multiplexor while shifting in said one direction, wherein said second multiplexor shifts in said first bit while shifting in said another direction.

3. The log shifter of claim 2, wherein said first recovery circuit comprises an AND gate performing a logical AND of said first bit and a control bit controlling the selection of said first multiplexor, wherein the output of said AND gate is provided as an input to said second multiplexor.

4. The log shifter of claim 3, wherein said first multiplexor is designed to select either said operand or said operand shifted in said one direction to generate said first output, wherein said second multiplexor is designed to select either said first output or said first output shifted in said second direction to generate said second output, said log shifter further comprising:
  a third multiplexor coupled to receive said second output, said third multiplexor selecting either said second output or said second output shifted in said one direction to generate a third output; and
  a fourth multiplexor coupled to receive said third output, said fourth multiplexor selecting either said third output or said third output shifted in said another direction to generate a fourth output.

5. The log shifter of claim 4, further comprising a second recovery circuit forwarding to said third multiplexor a second bit shifted out by said second multiplexor.

6. The log shifter of claim 4, further comprising a third recovery circuit, said third recovery forwarding said first bit to said fourth multiplexor if said second multiplexor selects said first output.

7. The log shifter of claim 6, wherein said third recovery circuit forwards a third bit shifted out by said third multiplexor if said third multiplexor selects said second output shifted in said one direction.

8. The log shifter of claim 7, wherein a logical zero is stored in most significant bit positions when performing a right shift.

9. The log shifter of claim 7, wherein a sign of said operand is stored in most significant bit positions when performing a right shift.

10. The log shifter of claim 9, further comprising another AND gate generating a logical AND of said sign and a signal indicating whether an arithmetic shift is being performed or a logical shift is being performed, wherein the output of said another AND gate is used when right shifting said operand.

11. The log shifter of claim 9, wherein said third recovery circuit comprises a fifth multiplexor selecting either the output of said another AND gate or a fourth bit shifted out by said third multiplexor.

12. The log shifter of claim 1, wherein said one direction comprises left direction and said another direction comprises right direction.

13. A system comprising:
  a memory storing an instruction designed to shift an operand in either left direction or right direction; and
  a processor executing said instruction, said processor comprising:
    an instruction fetch/decode unit fetching said instruction from said memory and examining said instruction;
    a log shifter coupled to said instruction fetch/decode unit, said log shifter executing said instruction, said log shifter comprising:
      first means for shifting said operand in one direction to generate a first output; and
      second means for shifting said first output in another direction to generate a second output.

14. The system of claim 13, wherein said second means for shifting shifts in a first bit while shifting said first output such that said first bit is contained in said second output, wherein said first bit is shifted out in said shifting said operand.

15. The system of claim 14, wherein said first means for shifting comprises a first multiplexor which selects said operand or a shifted operand under the control of a control bit to generate said first output, said system further comprises a logical AND gate performing an AND operation of said first bit and said control bit to generate an AND output, wherein said AND output is shifted in by said second means for shifting.

16. The system of claim 15, further comprising:
 third means for shifting said second output in said one direction to generate a third output; and
 fourth means for shifting said third output in said another direction to generate a fourth output.

17. The system of claim 16, wherein said third means for shifting shifts in a second bit such that said third output contains said second bit, wherein said second bit is shifted out by said second means for shifting.

18. The system of claim 16, wherein said second means for shifting comprises a second multiplexor which selects either said first output or a shifted first output under the control of a second control bit, wherein said fourth means for shifting shifts in said first bit if said second multiplexor selects said first output.

19. The system of claim 18, further comprising means for storing a logical zero in most significant bit positions when performing a right shift.

20. The system of claim 18, further comprising means for storing a sign of said operand in most significant bit positions when performing a right shift.

21. The system of claim 20, further comprising means for generating a logical AND of said sign and a signal to generate a logical AND output, wherein said signal indicates whether an arithmetic shift is being performed or a logical shift is being performed, wherein said logical AND output is used when right shifting said operand.

22. A processor executing an instruction designed to shift an operand in either left direction or right direction, said processor comprising:
 an instruction fetch/decode unit fetching said instruction on a bus and examining said instruction; and
 a log shifter coupled to said instruction fetch/decode unit, said log shifter executing said instruction, said log shifter comprising:
  a first multiplexor shifting said operand in one direction to generate a first output; and
  a second multiplexor coupled to receive said first output, said second multiplexor shifting said first output in another direction to generate a second output.

23. The processor of claim 22, further comprising a first recovery circuit forwarding to said second multiplexor a first bit shifted out by said first multiplexor while shifting in said one direction, wherein said second multiplexor shifts in said first bit while shifting in said another direction.

24. The processor of claim 23, wherein said first recovery circuit comprises an AND gate performing a logical AND of said first bit and a control bit controlling the selection of said first multiplexor, wherein the output of said AND gate is provided as an input to said second multiplexor.

25. The processor of claim 24, wherein said first multiplexor is designed to select either said operand or said operand shifted in said one direction to generate said first output, wherein said second multiplexor is designed to select either said first output or said first output shifted in said second direction to generate said second output, said processor further comprising:
 a third multiplexor coupled to receive said second output, said third multiplexor selecting either said second output or said second output shifted in said one direction to generate a third output; and
 a fourth multiplexor coupled to receive said third output, said fourth multiplexor selecting either said third output or said third output shifted in said another direction to generate a fourth output.

26. The processor of claim 25, further comprising a second recovery circuit forwarding to said third multiplexor a second bit shifted out by said second multiplexor.

27. The processor of claim 25, further comprising a third recovery circuit, said third recovery forwarding said first bit to said fourth multiplexor if said second multiplexor selects said first output.

28. The processor of claim 27, wherein said third recovery circuit forwards a third bit shifted out by said third multiplexor if said third multiplexor selects said second output shifted in said one direction.

29. The processor of claim 28, wherein a logical zero is stored in most significant bit positions when performing a right shift.

30. The processor of claim 28, wherein a sign of said operand is stored in most significant bit positions when performing a right shift.

31. The processor of claim 30, further comprising another AND gate generating a logical AND of said sign and a signal indicating whether an arithmetic shift is being performed or a logical shift is being performed, wherein the output of said another AND gate is used when right shifting said operand.

32. The processor of claim 30, wherein said third recovery circuit comprises a fifth multiplexor selecting either the output of said another AND gate or a fourth bit shifted out by said third multiplexor.

33. The processor of claim 22, wherein said one direction comprises left direction and said another direction comprises right direction.

34. A method of shifting an operand in either left direction or right direction, said method comprising:
 shifting said operand in one direction by the first shifter to generate a first output; and
 shifting said first output in another direction by the second shifter to generate a second output.

35. The method of claim 34, further comprising shifting in a first bit while performing said shifting said first output such that said first bit is contained in said second output, wherein said first bit is shifted out in said shifting said operand.

36. The method of claim 35, wherein said shifting said operand is implemented using a first multiplexor which selects said operand or a shifted operand under the control of a control bit to generate said first output, said method further comprises performing a logical AND of said first bit and said control bit to generate an AND output, wherein said AND output is shifted in in said shifting in.

37. The method of claim 36, further comprising:
 shifting said second output in said one direction to generate a third output; and
 shifting said third output in said another direction to generate a fourth output.

38. The method of claim 37, further comprising shifting in a second bit in said shifting said second output such that said third output contains said second bit, wherein said second bit is shifted out in said shifting said first output.

39. The method of claim 37, wherein said shifting said first output is implemented using a second multiplexor which selects either said first output or a shifted first output under the control of a second control bit, said method further comprising shifting in said first bit in said shifting said third output if said second multiplexor selects said first output.

40. The method of claim 39, further comprising storing a logical zero in most significant bit positions when performing a right shift.

41. The method of claim 39, further comprising storing a sign of said operand in most significant bit positions when performing a right shift.

42. The method of claim 41, further generating a logical AND of said sign and a signal to generate a logical AND output, wherein said signal indicates whether an arithmetic shift is being performed or a logical shift is being performed, wherein said logical AND output is used when right shifting said operand.

* * * * *